United States Patent
Li et al.

(10) Patent No.: US 11,402,550 B2
(45) Date of Patent: Aug. 2, 2022

(54) FLEXIBLE POLARIZING COVER PLATE HAVING HARD COATING WITH INK-FILLED GROOVES AND PREPARATION METHOD THEREOF

(71) Applicant: BOE TECHNOLOGY GROUP CO., LTD., Beijing (CN)

(72) Inventors: Jianwei Li, Beijing (CN); Paoming Tsai, Beijing (CN); Dejun Bu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 238 days.

(21) Appl. No.: 16/489,964

(22) PCT Filed: Mar. 26, 2019

(86) PCT No.: PCT/CN2019/079710
§ 371 (c)(1),
(2) Date: Aug. 29, 2019

(87) PCT Pub. No.: WO2019/205862
PCT Pub. Date: Oct. 31, 2019

(65) Prior Publication Data
US 2021/0011201 A1    Jan. 14, 2021

(30) Foreign Application Priority Data
Apr. 28, 2018  (CN) .......................... 201810400866.X

(51) Int. Cl.
*G02B 1/14* (2015.01)
*G02B 5/20* (2006.01)
(Continued)

(52) U.S. Cl.
CPC ................. *G02B 1/14* (2015.01); *G02B 5/20* (2013.01); *G02B 5/3025* (2013.01);
(Continued)

(58) Field of Classification Search
CPC ........ G02B 1/14; G02B 5/3041; G02B 5/305; G02F 1/133512; G02F 1/133528–13355; G02F 1/136209
See application file for complete search history.

(56) References Cited

U.S. PATENT DOCUMENTS

| 10,048,530 B1* | 8/2018 | Kim ................. G02F 1/133514 |
| 2007/0008459 A1* | 1/2007 | Park ................. G02F 1/133528 |
| | | 349/96 |

(Continued)

FOREIGN PATENT DOCUMENTS

| CN | 106773209 A | 5/2017 |
| CN | 108594515 A | 9/2018 |

(Continued)

OTHER PUBLICATIONS

International Search Report and Written Opinion dated Jul. 2, 2019, from application No. PCT/CN2019/079710.

*Primary Examiner* — Ryan S Dunning
(74) *Attorney, Agent, or Firm* — Arch & Lake LLP

(57) ABSTRACT

Disclosed herein is a flexible polarizing cover plate including laminated polarizers and a hard coating. The hard coating includes a viewable area and a black matrix area surrounding the viewable area. The black matrix area includes a plurality of grooves surrounding the viewable area and ink filled and cured in the plurality of grooves. A preparation method of a flexible polarizing cover plate, a display panel and a display device including the flexible polarizing cover plate are also provided.

20 Claims, 2 Drawing Sheets

(51) Int. Cl.
 *G02B 5/30* (2006.01)
 *G02F 1/1335* (2006.01)

(52) U.S. Cl.
 CPC ...... *G02B 5/3033* (2013.01); *G02F 1/133512* (2013.01); *G02F 1/133528* (2013.01)

(56) References Cited

U.S. PATENT DOCUMENTS

| | | | |
|---|---|---|---|
| 2014/0043683 A1* | 2/2014 | Jo | G02F 1/133528 359/483.01 |
| 2015/0205161 A1* | 7/2015 | Okita | G02F 1/136209 349/106 |
| 2018/0267352 A1* | 9/2018 | Li | G02F 1/133512 |
| 2019/0011772 A1* | 1/2019 | Yao | H01L 29/78633 |
| 2019/0025484 A1* | 1/2019 | Kim | G02B 1/14 |
| 2020/0393603 A1* | 12/2020 | Lee | B32B 27/36 |

FOREIGN PATENT DOCUMENTS

| | | |
|---|---|---|
| JP | 2013-225080 A | 10/2013 |
| JP | 6089439 B2 | 3/2017 |
| KR | 20170043302 A | 4/2017 |

\* cited by examiner

FLEXIBLE POLARIZING COVER PLATE HAVING HARD COATING WITH INK-FILLED GROOVES AND PREPARATION METHOD THEREOF

CROSS REFERENCE

The present application is based on International Application No. PCT/CN2019/079710, filed on Mar. 26, 2019, which is based on and claims the priority of Chinese Patent Application No. 201810400866.X, filed on Apr. 28, 2018, the entire disclosure of which is hereby incorporated by reference.

TECHNICAL FIELD

The present disclosure relates to the field of display technologies, in particular, relates to a flexible polarizing cover plate for a display device and a preparation method thereof, a display panel and a display device including the same.

BACKGROUND

In a conventional flexible polarizing cover plate, a flexible transparent hard coating is often used in place of a polarizing protective layer in a flexible polarizing layer. For example, a CPI hard coating is used in place of a TAC or COP film in a polarizing layer. Although such a flexible polarizing plate can realize integration of a cover plate and a polarizing layer, due to a BM (black matrix) area provided on the back surface of the hard coating, the overall thickness of the flexible polarizing cover plate is still large, and a roll to roll process cannot be applied.

SUMMARY

The present disclosure provides a flexible polarizing cover plate and a preparation method thereof, a display panel and a display device including the same.

One aspect of the present disclosure provides a flexible polarizing cover plate. The flexible polarizing cover plate includes laminated polarizers and a hard coating. The hard coating includes a viewable area and a black matrix area surrounding the viewable area. The black matrix area includes a plurality of grooves surrounding the viewable area and ink filled and cured in the plurality of grooves.

According to an arrangement of the present disclosure, a spacing between adjacent grooves of the plurality of grooves is less than 5 μm.

According to another arrangement of the present disclosure, each of the grooves has a depth of 4-6 μm and a width of 6-8 μm.

According to another arrangement of the present disclosure, the hard coating has a thickness of 8 to 12 μm.

According to another arrangement of the present disclosure, the hard coating is made of a polymer transparent material.

Another aspect of the present disclosure provides a preparation method of a flexible polarizing cover plate. The method includes: forming a hard coating on a polarizer; etching a plurality of grooves in a peripheral area of the hard coating; and forming a black matrix by filling and curing ink in the plurality of grooves.

According to an arrangement of the present disclosure, the hard coating is formed on the polarizer by a roll-to-roll process.

According to another arrangement of the present disclosure, the plurality of grooves are formed in a peripheral area of the hard coating by laser etching.

The present disclosure also provides a display panel including the above flexible polarizing cover plate.

The present disclosure also provides a display device including the above display panel.

Figure 1:
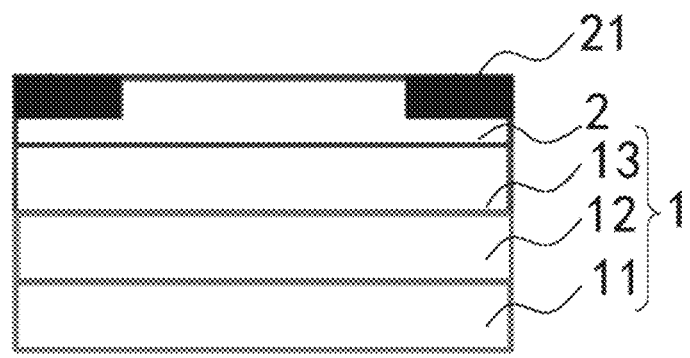
FIG. 1 is a schematic diagram of a flexible polarizing cover plate according to an arrangement of the present disclosure.

Reference numerals are illustrated as follows.
1: Polarizer
11: Optical transparent pressure sensitive adhesive layer
12: Polarizing layer
13: Plastic substrate
2: Hard coating
21: BM area
211: Ink
22: Viewable area

DETAILED DESCRIPTION

Example arrangements will now be described more fully with reference to the accompanying drawings. However, the example arrangements can be embodied in a variety of forms and should not be construed as being limited to the arrangements set forth herein. Rather, these arrangements are provided to make the present disclosure more thorough and complete, and to fully convey the concept of the example arrangements to those skilled in the art. In the figures, the thickness of the areas and layers may be exaggerated for clarity. The same reference numerals in the drawings denote the same or similar structures, and thus their detailed description will be omitted.

As shown in FIG. 1, the flexible polarizing cover plate includes a polarizer 1 and a hard coating 2, which includes a viewable area (VA) 22 and a BM (black matrix) area 21 surrounding the viewable area 22. The black matrix area 21 includes a plurality of grooves surrounding the viewable area 22 and ink 211 filled and cured in the grooves. The polarizer 1 of FIG. 1 includes an optical transparent pressure sensitive adhesive (PSA) layer 11, a polarizer 12, and a plastic substrate 13. However, those skilled in the art can understand that the polarizer suitable for the present disclosure is not limited to the above structure.

The PSA layer 11 is an optical transparent pressure sensitive adhesive having good adhesion effect. One side of the pressure sensitive adhesive layer 11 may further include a release film and a protective film. The polarizing layer 12 may be a PVC film, and may include, but is not limited to, an anti-glare layer (AG film), a low reflection/non-reflection layer (LR/AR), a WVDLC optical compensation film, and the like. The plastic substrate 13 serves as a support, and may be, but not limited to, a flexible transparent film such as TAC, COP, or CPI. The hard coating 2 may have a hardened layer of an AF (anti-fingerprint) function, and is a water-repellent and oil-repellent transparent polymer material layer such as polytetrafluoroethylene. The thickness of the hard coating 2 may be 8-12 micrometers (μm), optionally 10 μm.

The BM area 21 is formed by a plurality of grooves formed on the hard coating 2 and ink 211 filled in the plurality of grooves. The groove of the BM area 21 may be formed into a plurality of loop-shaped grooves around the viewable area 22, or may be other structures capable of preventing light leakage, or may be other light-shielding materials capable of preventing light leakage. In order to prevent light leakage, the spacing between adjacent grooves in the plurality of loop-shaped grooves is less than 5 μm to ensure an effective light shielding effect so that after filled with the ink, it cannot be recognized by human eyes. The depth of the loop-shaped groove can be 4-6 μm, ensuring an effective leveling effect after the ink 211 is filled. The width of the loop-shaped groove is 6-8 μm, and the ink 211 in the groove can be filled by screen printing or the like and then solidified.

Figure 2:
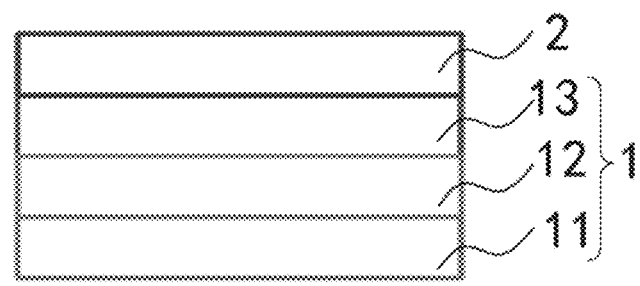
FIGS. 2, 3 and 4 are flow charts for preparing a flexible polarizing cover plate according to an arrangement of the present disclosure.
Figure 3:
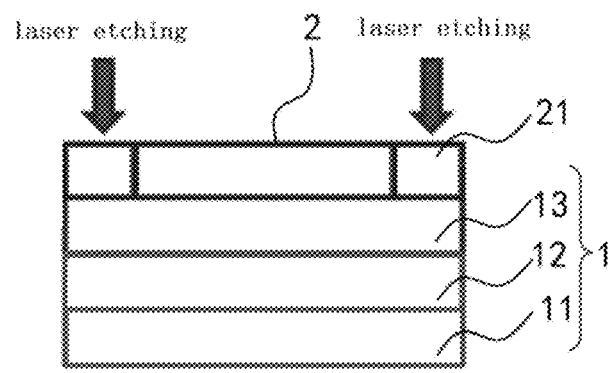
Figure 4:
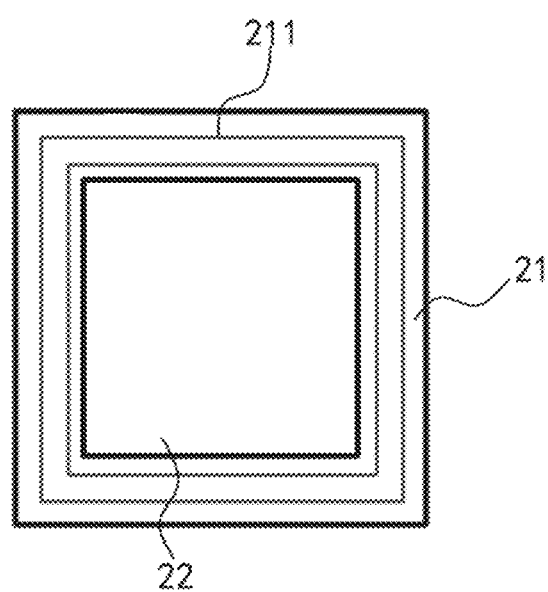

The formation process of the flexible polarizing cover plate is shown as FIGS. 2 to 4. First, the hard coating 2 is formed on the polarizer 1 by a roll to roll process. Then, a plurality of grooves (for example, loop-shaped grooves) is formed in the BM area 21 of the hard coating by laser etching. The spacing between adjacent grooves of the plurality of grooves is less than 5 μm, the depth of the groove is 4-6 μm, and the width is 6-8 μm. Finally, the BM area 21 is screen printed with the corresponding ink by screen printing, and then, due to its proper fluidity, the ink can effectively fill the dense loop-shaped groove of the hard coating layer. Ultimately, the above structural material is baked and cured, such that the BM area forms an effective ink structure In the flexible polarizing cover plate of the present disclosure, ink is directly embedded into the cover structure to form the BM area, and does not require an additional BM area, which can reduce the overall thickness of the cover plate. Moreover, the method of the present disclosure does not need to perform ink patterning treatment on the back surface of the cover plate, so that the flexible polarizing cover plate of the present disclosure can adopt a Roll to Roll process, which can improve production efficiency and reduce cost.

Of course, the present disclosure may have various other arrangements, and various corresponding changes and modifications may be made by those skilled in the art without departing from the spirit and scope of the disclosure. Changes and modifications are intended to be included within the scope of the appended claims.

What is claimed is:

1. A flexible polarizing cover plate, comprising:
a polarizer comprising an optical transparent pressure sensitive adhesive layer, a polarizing layer, and a plastic substrate;
and a hard coating having a hardened layer of an anti-fingerprint function and laminated on the plastic substrate by a roll-to-roll process;
wherein the hard coating is provided with a plurality of grooves in which ink is filled and cured and comprises a viewable area and a black matrix area surrounding the viewable area, and the plurality of grooves are disposed in the black matrix area.

2. The flexible polarizing cover plate according to claim 1, wherein a spacing between adjacent grooves of the plurality of grooves is less than about 5 micrometers (μm).

3. The flexible polarizing cover plate according to claim 1, wherein each of the grooves has a depth of about 4 μm to 6 μm and a width of about 6 μm to 8 μm.

4. The flexible polarizing cover plate according to claim 1, wherein the hard coating has a thickness of about 8 μm to 12 μm.

5. The flexible polarizing cover plate according to claim 1, wherein the hard coating is made of a polymer transparent material, and the polymer transparent material comprises polytetrafluoroethylene.

6. The flexible polarizing cover plate according to claim 1, wherein the pressure sensitive adhesive layer includes a release film and a protective film.

7. The flexible polarizing cover plate according to claim 1, wherein the polarizing layer is a PVC film, and comprises an anti-glare layer, a low reflection/non-reflection layer, or a WVDLC optical compensation film.

8. The flexible polarizing cover plate according to claim 1, wherein the plastic substrate serves as a support, and a TAC flexible transparent film, a COP flexible transparent film, or a CPI flexible transparent film.

9. A display panel comprising the flexible polarizing cover plate of claim 1.

10. The display panel according to claim 9, wherein a spacing between adjacent grooves of the plurality of grooves is less than 5 μm.

11. The display panel according to claim 9, wherein each of the grooves has a depth of about 4 μm to about 6 μm and a width of about 6 μm to about 8 μm.

12. The display panel according to claim 9, wherein the hard coating has a thickness of about 8 to about 12 μm.

13. The display panel according to claim 9, wherein the hard coating is made of a polymer transparent material.

14. The display panel according to claim 9.

15. The display device according to claim 14, wherein a spacing between adjacent grooves of the plurality of grooves is less than about 5 μm.

16. The display device according to claim 14, wherein the grooves have a depth of about 4 μm to about 6 μm and a width of about 6 μm to about 8 μm.

17. The display device according to claim 14, wherein the hard coating has a thickness of about 8 μm to about 12 μm.

18. The display device according to claim 14, wherein the hard coating is made of a polymer transparent material.

19. A preparation method of a flexible polarizing cover plate, comprising:
providing a polarizer having an optical transparent pressure sensitive adhesive layer, a polarizing layer, and a plastic substrate;
forming a hard coating with a hardened layer of an anti-fingerprint function on the plastic substrate by roll-to-roll process;
etching a plurality of grooves in a peripheral area of the hard coating; and
forming a black matrix by filling and curing ink in the plurality of grooves;
wherein the hard coating comprises a viewable area and the black matrix area surrounding the viewable area, and the plurality of grooves are disposed in the black matrix area.

20. The preparation method according to claim 19, wherein the plurality of grooves are formed in the peripheral area of the hard coating by laser etching.

* * * * *